(12) United States Patent
Sakano (10) Patent No.: US 7,693,656 B2
(45) Date of Patent: Apr. 6, 2010

(54) NAVIGATION APPARATUS

(75) Inventor: Hirokazu Sakano, Tokai (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/707,955

(22) Filed: Feb. 20, 2007

(65) Prior Publication Data

US 2007/0225909 A1 Sep. 27, 2007

(30) Foreign Application Priority Data

Mar. 24, 2006 (JP) ............... 2006-082842

(51) Int. Cl.
*G01C 21/30* (2006.01)
*G01C 21/32* (2006.01)

(52) U.S. Cl. ............... 701/210; 701/200; 701/201; 701/202; 701/206; 123/198 R; 123/198 B; 123/198 D; 224/42.25; 224/535; 224/569; 280/33.994; 307/10.2; 307/10.3; 307/10.4; 307/10.5; 307/10.6; 340/988; 340/994; 340/995.28

(58) Field of Classification Search ............... 701/210, 701/200, 201, 202, 206; 123/198, 198 B, 123/198 R, 198 D; 224/42.25, 535, 569; 280/33.994; 307/10.2, 10.3, 10.4, 10.5, 10.6; 70/57.1; 340/988, 994, 995.28
See application file for complete search history.

(56) References Cited

U.S. PATENT DOCUMENTS

| | | | | | |
|---|---|---|---|---|---|
| 5,796,178 | A | * | 8/1998 | Onuma | 307/10.2 |
| 6,107,933 | A | * | 8/2000 | Endo | 340/5.28 |
| 6,505,100 | B1 | * | 1/2003 | Stuempfle et al. | 701/1 |
| 6,717,508 | B2 | * | 4/2004 | Sashida | 340/5.72 |
| 6,886,060 | B2 | * | 4/2005 | Wang et al. | 710/72 |
| 6,957,136 | B2 | * | 10/2005 | Tachibana et al. | 701/35 |
| 7,176,788 | B2 | * | 2/2007 | Park | 340/426.19 |
| 7,260,475 | B2 | * | 8/2007 | Suzuki | 701/208 |
| 7,268,665 | B2 | * | 9/2007 | Inagaki et al. | 340/5.72 |
| 7,388,473 | B2 | * | 6/2008 | Teshima et al. | 340/426.17 |
| 2002/0046285 | A1 | * | 4/2002 | Yasushi et al. | 709/228 |
| 2002/0059532 | A1 | * | 5/2002 | Ata et al. | 713/202 |
| 2004/0002793 | A1 | * | 1/2004 | Tachibana et al. | 701/1 |
| 2004/0225416 | A1 | * | 11/2004 | Kubota et al. | 701/1 |
| 2005/0173986 | A1 | * | 8/2005 | Hara et al. | 307/10.1 |
| 2005/0282519 | A1 | * | 12/2005 | Kobayashi et al. | 455/408 |
| 2006/0055509 | A1 | * | 3/2006 | Teshima et al. | 340/5.53 |
| 2006/0148449 | A1 | * | 7/2006 | Budde et al. | 455/410 |

FOREIGN PATENT DOCUMENTS

| | | |
|---|---|---|
| JP | A-08-292036 | 11/1996 |
| JP | A-2001-184569 | 7/2001 |
| JP | A-2002-286460 | 10/2002 |

(Continued)

*Primary Examiner*—Khoi Tran
*Assistant Examiner*—Jorge O Peche
(74) *Attorney, Agent, or Firm*—Posz Law Group, PLC (57) ABSTRACT

In a navigation apparatus in a vehicle, a user designates a validating route, which is stored in a memory device. A control unit invalidates a predetermined function of the navigation apparatus at a start-up, which is for the first time after an in-vehicle battery is connected or which results from turning on of a power source. Use of the navigation apparatus by the user is thereby disturbed. When the control unit determines that a route, which the vehicle has traveled through, is included in the previously designated validating route stored in the memory device, the control unit re-validates the invalidated predetermined function.

1 Claim, 6 Drawing Sheets

FOREIGN PATENT DOCUMENTS

| | | |
|---|---|---|
| JP | A-2002-298292 | 10/2002 |
| JP | A-2002-357429 | 12/2002 |
| JP | A-2003-112604 | 4/2003 |
| JP | A-2003-317194 | 11/2003 |
| JP | A-2004-175295 | 6/2004 |

* cited by examiner

NAVIGATION APPARATUS

CROSS REFERENCE TO RELATED APPLICATION

This application is based on and incorporates herein by reference Japanese Patent Application No. 2006-82842 filed on Mar. 24, 2006.

FIELD OF THE INVENTION

The present invention relates to a navigation apparatus having an anti-theft function.

BACKGROUND OF THE INVENTION

Stealing a vehicle or a navigation apparatus mounted in a vehicle has been increasing. To prevent stealing of a vehicle, Patent document 1 discloses an anti-theft system. In the system, it is monitored whether the vehicle departs from a designated travel route by a predetermined distance. When the vehicle has departed, an operator is given an alarm against departing from the travel route. When the alarm is not released, an emergency warning is generated and information on theft including vehicle's positional information is transmitted to an information center or security company.

To prevent stealing of a navigation apparatus from a vehicle, Patent document 2 discloses an anti-theft technology. In the technology, an initial position, where the engine is turned off, is stored. The stored initial position is compared with the next position, where the engine is re-started. When two positions do not accord with each other, usual operations of the navigation apparatus are prohibited as far as a correct password is inputted.

Patent document 1: JP-A-2003-112604
Patent document 2: JP-A-2001-184569

The anti-theft system in Patent document 1 is useful in preventing stealing a vehicle itself but useless in stealing a navigation apparatus. The anti-theft technology in Patent document 2 may be generally useful in preventing stealing a navigation apparatus mounted in a subject vehicle. However, when the navigation apparatus stolen from the subject vehicle is then installed to a vehicle close to the subject vehicle, the stolen navigation apparatus may usually operate.

SUMMARY OF THE INVENTION

It is an object of the present invention to provide a navigation apparatus solving the above problems or the like. In this navigation apparatus, a predetermined function is invalidated to thereby help prevent stealing of the navigation apparatus; further, the invalidated function is validated again only by an authorized user.

According to an aspect of the present invention, a navigation apparatus is provided as follows. A position detector is included to detect a position. A traveled route identification unit is included to identify a traveled route based on the detected position. A validating route storage unit is included to store a validating route, which is designated by a user. A function control unit is included to (i) invalidate a predetermined function at a start-up, which is for a first time after a battery is connected or which results from turning on of a power source, and (ii) validate the invalidated predetermined function when the stored validating route is included in the identified traveled route.

According to another aspect of the present invention, a navigation apparatus is provided as follows. A position detector is included to detect a position. A validating point storage unit is included to store a validating point, which is designated by a user. A function control unit is included to (i) invalidate a predetermined function at a start-up, which is for a first time after a battery is connected or which results from turning on of a power source, and (ii) validate the invalidated predetermined function when the detected position accords with the stored validating point.

According to yet another aspect of the present invention, a navigation apparatus is provided as follows. A position detector is included to detect a position. A traveled record designation unit is included to designate a traveled record based on the detected position. A validating condition storage unit is included to store a validating condition, which is designated by a user. An invalidating control unit is included to invalidate a predetermined function at a start-up. A validating control unit is included to validate the predetermined function invalidated by the invalidating control unit when the designated traveled record satisfies the stored validating condition.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
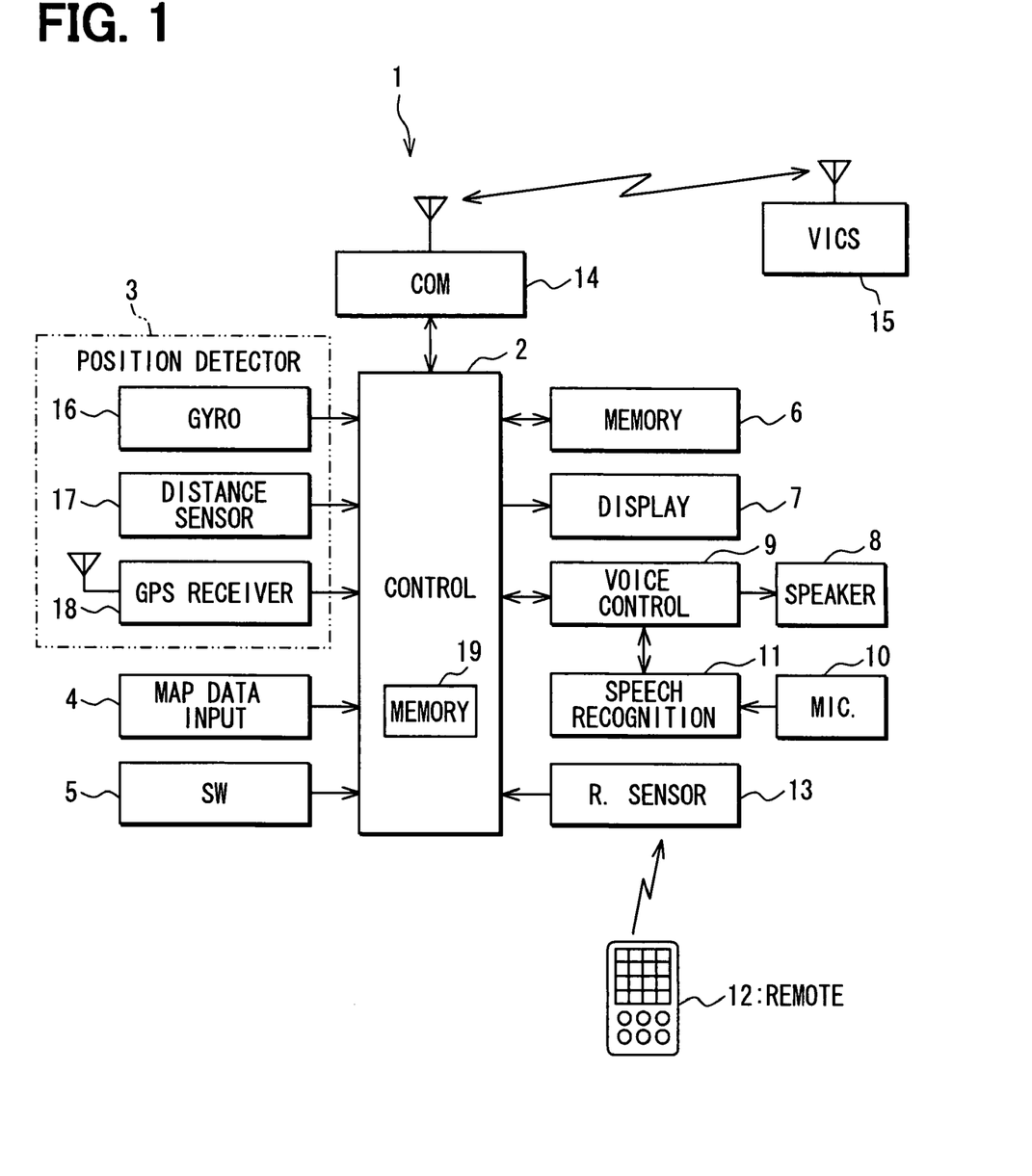
FIG. 1 is an electrical block diagram for a navigation apparatus according to a first embodiment of the present invention.

A navigation apparatus 1 mounted in a subject vehicle will be explained below as an embodiment of the present invention. As shown in FIG. 1, the navigation apparatus 1 includes a control unit 2 mainly having a micro-computer; a position detector 3 detecting a current position of the vehicle; a map data input unit 4, an operation switch group 5; an external memory device 6; a display unit 7 having liquid crystal color display; a voice controller 9 connected with a speaker 8; a speech recognition unit 11 recognizing speeches from a microphone 10; a remote sensor 13 communicating commands or the like with a remote 12; and a communications unit 14 as an external information input/output unit to perform data communications by wireless with an outside information center 15 (e.g., VICS (Vehicle Information and Communication System) center (Trademark)).

The position detector 3 includes a gyro scope 16 detecting a vehicle's rotational angular speed; a distance sensor 17 detecting a vehicle's traveled distance; and a GPS (Global Positioning System) receiver 18 detecting a current position of the vehicle based on electric waves from satellites. The sensors or the like 16 to 18 have individual error types. To that end, the control unit 2 amends detection values from the sensors or the like 16 to 18 with each other to thereby accurately detect a current position, heading direction, speed, traveled distance, current clock time or the like. Further, part of the sensors or the like 16 to 18 may be used depending on a required detection accuracy. Further, the position detector may include another sensor such as a rotation sensor for a steering wheel or wheel sensor for each following wheel.

The map data input unit 4 includes a drive device for reading out data from a map data storage medium. The data include road map data, landmark data, map-matching data, destination data (i.e., facility database), and table data for converting traffic information to road data. The map data storage medium should generally be a medium have a large data volume such as DVD; further, the medium may be a memory card, hard disk drive, or the like.

The road map data include data of road shapes, road widths, road names, traffic signals, crossings, buildings, facilities, place names, land shapes, or the like. The road map data further include data for rendering the road map in a screen on the display unit 7. The destination data include information on facilities, shops, private residences, and place names. Facilities include transportation entities, leisure facilities, accommodations, and public offices. The shops include retail outlets, department stores, and restaurants. The private residences include condominiums and residences. Further, each of the data includes a telephone number, address, longitude and latitude, and landmark. The landmark is used for superimposing a facility on a road map in the screen of the display unit 7.

The operation switch group 5 as input means may be mechanical 5 switches surrounding the screen of the display unit 7 or touch-sensitive panel on the screen. The operation switch group 5 is used for a user or driver to enter data. The entered data include destinations, information for retrieving destinations, and commands. The commands are used for setting a validating route or a validating point (to be explained) and switching screens or display modes of the display unit 7 (e.g., map scale change, menu display selection, route retrieval, route guide start, current position adjustment, and voice volume control). The remote 12 has multiple operation switches to send various instruction signals to the control unit 2 via the remote sensor 13. The remote 12 can be an input means equivalent to the operation switch group 5.

The external memory device 6 may be flash memory. The external memory device 6 includes certain data such as data on a route to a destination set by the control unit 2 in a route guide, and data on a route traveled by the vehicle.

The display unit 7 displays, in its screen, a map surrounding a vehicle's current position in multiple map scales and a current position mark (pointer) for indicating a current position and heading direction of the vehicle. The current position mark is superimposed on the map. Further, during the route guide to a destination, a window is displayed for guiding the user along the route. Further, other windows are displayed for a user to enter information necessary for retrieving and to designate a destination. Furthermore, various messages are displayed. An anti-theft function to be explained can disable or invalidate a window from appearing.

The speech recognition unit 11 collates speeches inputted via the microphone 10 with recognition dictionary data internally stored to thereby recognize the inputted speeches. The voice controller 9 controls the speech recognition unit 11 to output speech recognition results to the control unit 2 and the recognized speech to output as talk back via the speaker 8. Further, the voice controller 9 outputs sounds output signals via the speaker 8 based on an instruction from the control unit 2. The speeches or sounds outputted via the speaker 8 relate to a guide, an operational instruction, notification indicating that the anti-theft function is operating, a talk back based on the speech recognition result, or the like.

The micro-computer of the control unit 2 has a CPU, memory (e.g., RAM, ROM, EEPROM, flash memory), and I/O. The control unit 2 includes a memory device 19, which is electrically erasable non-volatile memory such as EEPROM or flash memory to store data on a validating route or validating point, which will be explained later. The CPU executes a program stored in the ROM or flash memory, so that the control unit 2 can function as destination designating means, route retrieving means, display controlling means, route guiding means, passing route designating means, function controlling means, current position adjusting means, or the like. The function as the route retrieving means is for automatically computing a recommended travel route from a starting point (or current position) to a destination, e.g., using the Dijkstra method.

The function as the route guiding means is for displaying a road map surrounding a current position in the screen of the display unit 7 and superimposing a current position mark indicating a current position and heading direction of the vehicle on the displayed road map. In this case, the current position mark moves on the map to follow the vehicle's travel and a road map is scrolled to constantly show the current position of the vehicle. Here, a map matching process is performed to the current position of the vehicle to be on a road.

Figure 2:
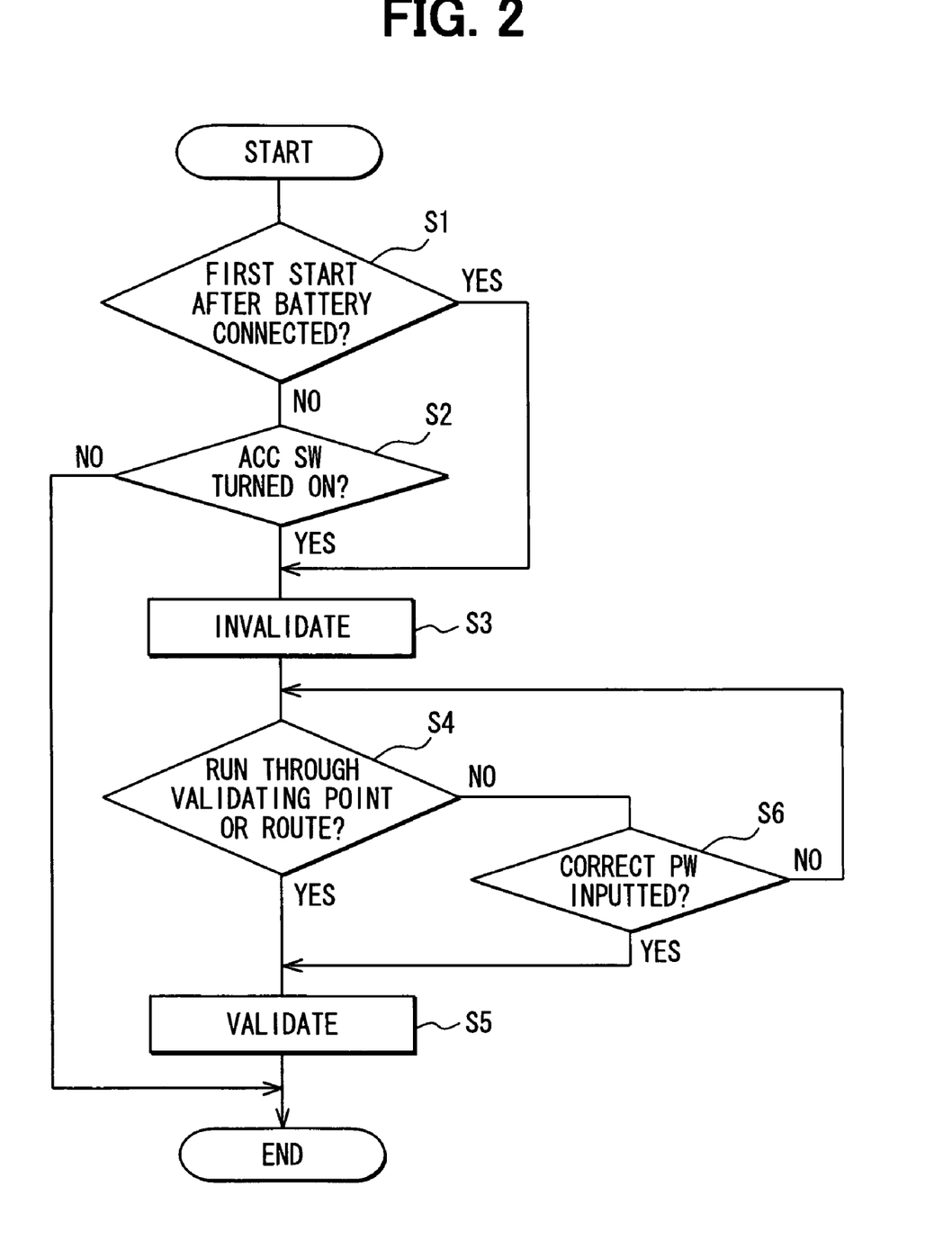
FIG. 2 is a flowchart diagram illustrating a function control process of the first embodiment.

Next, an anti-theft function for the navigation apparatus 1 will be explained with reference to FIGS. 2, 3A, and 3B. When the navigation apparatus 1 is stolen from a first vehicle, a signal cable connected with another in-vehicle device is disconnected and a power source cable connected with an in-vehicle battery is also disconnected. The stolen navigation apparatus is then connected with an equivalent signal cable and power source cable mounted in a second vehicle. FIG. 2 illustrates a function control process performed by the control unit 2 when the navigation apparatus 1 is supplied with the power from an in-vehicle battery.

The control unit 2 determines whether a start-up or activation of the navigation apparatus 1 is the first one after the navigation apparatus 1 is connected with the in-vehicle battery. The navigation apparatus 1 is driven by a power source VB supplied via an accessory (ACC) switch from the battery and, also, driven by a power source +B supplied directly from the battery without the ACC switch intervening. When the power source +B is released from or disconnected with the navigation apparatus 1, a predetermined memory area in the control unit 2 is cleared or erased by a hardware unit. The control unit 2 reads out data in the predetermined memory area to thereby perform the above determination at Step S1. After the determination, predetermined data are written in the predetermined memory area.

When the determination at Step S1 is negated, Step S2 is then performed to determine whether the start-up is triggered by (or results from) an event that the ACC switch is turned to an ON state from an OFF state (i.e., an event that the power source to the navigation apparatus 1 is supplied). The time when the ACC switch is turned to the ON state is almost the same as the time when the engine is turned on. When the determination at Step S2 is also negated, the process is terminated. In contrast, when the determination either at Step S1 or Step S2 is affirmed, Step S3 is then performed. In this embodiment, two determinations at Step S1 and Step S2 are provided; however, one of the determinations at Step S1 and Step S2 may be alternatively provided.

The control unit 2 invalidates (i.e., stops) a predetermined function necessary for normally operating the navigation apparatus 1, in order to disturb the use of the user. The invalidated predetermined function may be a specific function such as a window display function, a map display function, a sound output function, a route designation function, a route guide function, or an overall operation function. Further, when the navigation apparatus 1 has an audio function (playing radio, CD, or MD), the audio function may be invalidated. In other words, the invalidated function should disturb the use of the user to thereby disable or extremely limit the use of the navigation apparatus 1.

To re-validate the invalidated function, the vehicle is required to travel or run through a route (referred to as a validating route) previously designated (i.e., registered) by an authorized user. Alternatively, the vehicle is required to travel or run through a point (referred to as a validating point) previously registered by an authorized user. The condition for validating the invalidated function may be assigned to either the validating route or validating point depending on the selection by the authorized user. The condition for validating may be assigned to an AND condition or an OR condition of the validating route and the validating point.

The condition for validating (a validating route or validating point) can be designated after a password (to be explained) is entered or after the vehicle runs through the validating route or validating point. For instance, as the operation switch group 5 or remote 13 is operated, a designation mode is activated. A validating route or validating point can be designated on a map displayed in the screen through a pointing operation. In this case, a validating route can be designated as the whole or part of an optimum route to a destination displayed with a destination retrieval function or route retrieval function; a validating point can be designated as a point included in the optimum route.

Figure 3A:
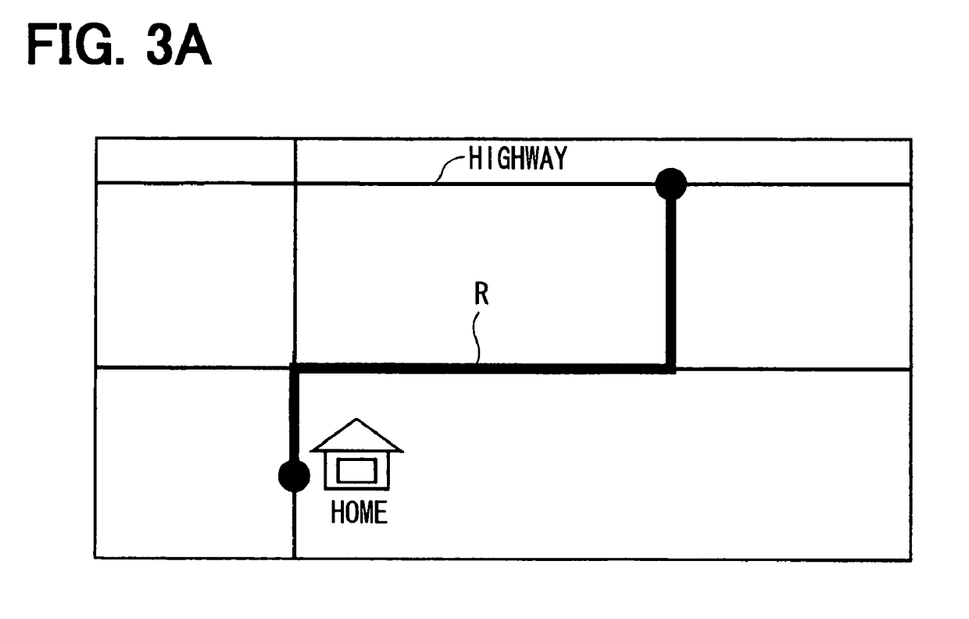
FIG. 3A is a view of a window as an example for illustrating a validating route.
Figure 3B:
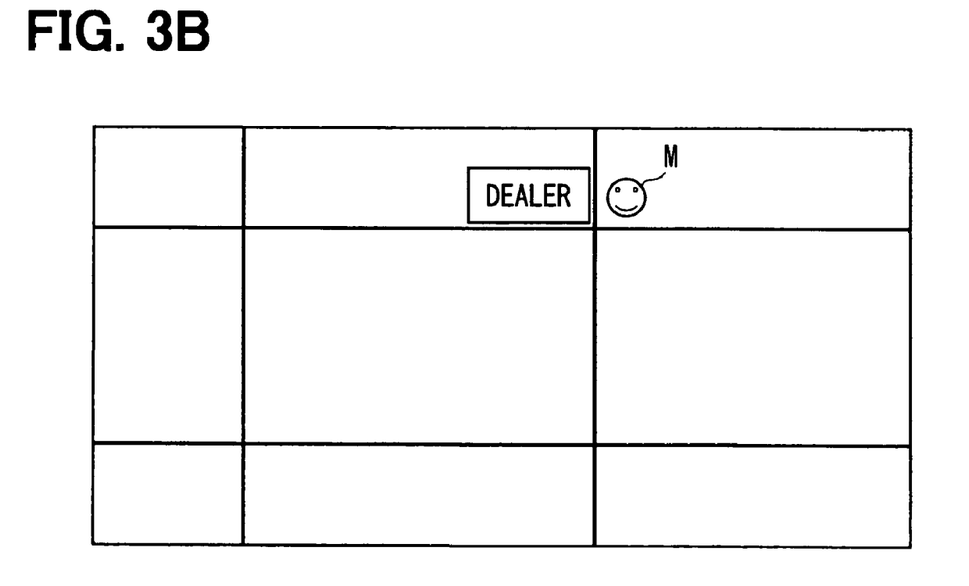
FIG. 3B is a view of a window as an example for illustrating a validating point.

FIGS. 3A, 3B illustrate window examples for designating a validating route and validating point, respectively. FIG. 3A shows that a validating route is designated as a route from home to a highway (viewed as a bold line R). FIG. 3B shows that a validating point is designated as a point (viewed as M). Alternatively, another designation method may be used. For instance, a validating route may be designated as a route traveled by the vehicle from when a designation start operation is performed to when a designation end operation is performed; a validating point may be designated as a point located by the vehicle when a designation operation is performed. Here, the validating route or validating point once designated is displayed only for a predetermined time period after a password is entered or the vehicle has traveled the validating route or the validating point.

The control unit 2 performs a map matching process based on the road map data and vehicle' current position detected by the position detector 3 and generates traveled route data for specifying or identifying a route traveled by the vehicle from the start-up to then store the generated traveled route data in the external memory device 6. Again, referring to FIG. 2, the control unit 2 determines whether the validating route stored in the memory device 19 comes to be included in the traveled route data stored in the external memory device 6 (Step S4) (i.e., whether the vehicle has traveled the validating route or not).

In contrast, the condition for validating may be assigned to a validating point. In this case, the control unit 2 determines whether the traveled route data stored in the external memory device 6 includes the validating point (Step S4) (i.e., whether the vehicle has traveled through the validating point or not). The determination at Step S4 is performed based on the route data (i.e., link information) after the map matching process, which helps prevent mis-determination even when a computing result of GPS has an error in positioning.

When the determination at Step S4 is affirmed, Step S5 is then performed to re-validate the once invalidated function. The process is then terminated. Thus, the navigation apparatus 1 returns to a normal operation to allow the authorized user to use it. In contrast, when the stolen navigation apparatus 1 is mounted in another certain vehicle by an unauthorized user, the certain vehicle might not travel the validating route or validating point since the unauthorized user does not know the existence of the validating route or validating point.

When the control unit 2 determines that the vehicle has not traveled through at Step S4, Step S6 is then performed to determine whether an authorized password is entered. This password is, for instance, a serial number uniquely assigned to the navigation apparatus 1. When the authorized password is determined to be entered, Step S5 is then performed. When the authorized password is determined not to be entered, Step S4 is again performed.

Thus, when the vehicle has not traveled through the validating route or the validating point and also the authorized password is not entered, Step S4 and Step S6 are repeatedly performed to thereby prohibit the navigation apparatus 1 from returning to the normal operation. For the period for repeating Step S4 and Step S6, a warning message such as "Anti-theft function is operating" is displayed for the user not to mistakenly regard the abnormal operation as a malfunction in the navigation apparatus 1. Further, alternatively or simultaneously, the warning message may be outputted via the speaker 8.

As explained above, the navigation apparatus 1 of this embodiment is disabled or invalidated with respect to a predetermined function to thereby prohibit a normal operation (i) each time the ACC switch is turned on (i.e., the power source to the navigation apparatus 1 is tuned on) or (ii) when the navigation apparatus 1 is started up for the first time after being connected with an in-vehicle battery in such a case where the navigation apparatus 1 is dismounted from a vehicle and then mounted in another vehicle. To return the navigation apparatus 1 to a normal operation, the vehicle is required to travel through the validating route or the validating point predetermined by the authorized user. In other words, the navigation apparatus 1 stolen by an unauthorized user cannot normally operate, which raises the effect to deter stealing of the navigation apparatus 1.

For instance, a validating route or validating point may be designated as a route or a point of the route for the authorized user to travel for a commute. Such a validating route or validating point can be designated by the user and is related closely to a daily life. Unlike a password, thus designated validating route or validating point is not easily forgotten. Therefore, only the authorized user can securely and easily return the invalidated function of the navigation apparatus 1 to a normal operation. Further, while the predetermined function is invalidated, a message for notifying the invalidation is outputted to the user. This helps prevent that the user regards the invalidated function as a malfunction.

A password is provided as an additional means for re-validating the function to thereby return the navigation apparatus 1 to a normal operation. This password may be used, for instance, during a journey to an unfamiliar place. In this journey, the vehicle does not naturally travel through the validating route or validating point. The password may be further used in other cases, e.g., when a validating route or validating point is designated newly after purchasing, resale, or battery thorough discharging; when it is determined whether the determination at Step S1 in FIG. 2 should be included within or excluded from the function control process; or when it is determined whether the determination at Step S2 in FIG. 2 should be included within or excluded from the function control process.

Second Embodiment

Figure 4:
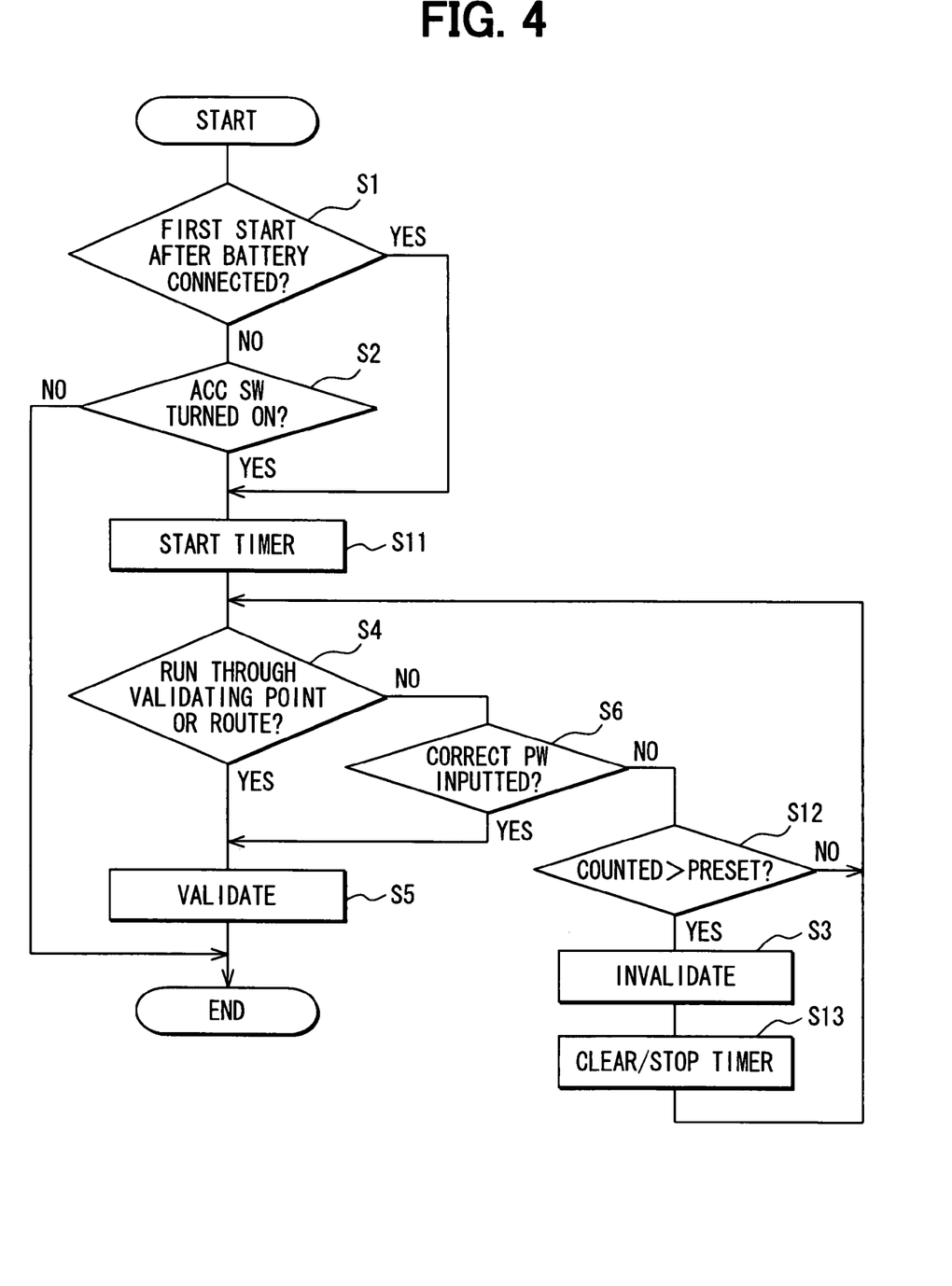
FIG. 4 is a flowchart diagram illustrating a function control process of a second embodiment.

FIG. 4 is similar to FIG. 2 to illustrate a function control process performed by the control unit 2 in a second embodiment when the navigation apparatus 1 is supplied with the power from an in-vehicle battery. Steps in FIG. 4 identical to those in FIG. 2 are assigned the same step numbers. Step S11, Step S12, Step S13 are new steps included in the process in the second embodiment. The control unit 2 of the second embodiment does not invalidate the predetermined function until a predetermined grace period elapses from the start-up; therefore, the navigation apparatus 1 continues the normal operation during the grace period.

Just after Step S2 is performed, the control unit 2 does not perform Step S3 for invalidating the function but, alternatively, Step S11 for starting a timer (i.e., starting counting of the timer) to count the grace period (e.g., ten minutes). Then, when both the determinations at Step S4 and Step S6 are negated (i.e., when the vehicle has not traveled through the validating route or validating point and the authorized password is not entered), Step S12 is then performed. At Step S12, it is determined whether the counted time has reached the grace period or not (i.e., whether the grace period has elapsed or not). When negated at Step S12, Step S4 is again performed.

In contrast, when affirmed at Step S12, Step S3 is performed-to invalidate the predetermined function for the first time. Then, the timer (i.e., counting the timer) is stopped at Step S13 and Step S4 is again performed. Since the timer is stopped, Steps S3, S13 are not again performed, which is similar to the process in FIG. 2.

In the second embodiment, when the vehicle has traveled through the validating route or validating point within the grace period from the start-up, the navigation apparatus 1 can normally operate or function. This can eliminate inconvenience of the authorized user to be unable to use the navigation apparatus 1 (although the inconvenience is undergone for a short period). Here, the unauthorized user can also use the navigation apparatus 1 for the grace period; however, the navigation apparatus 1 cannot normally operate after the grace period has elapsed. This still has the effect to deter stealing of the navigation apparatus 1.

Third Embodiment

Figure 5:
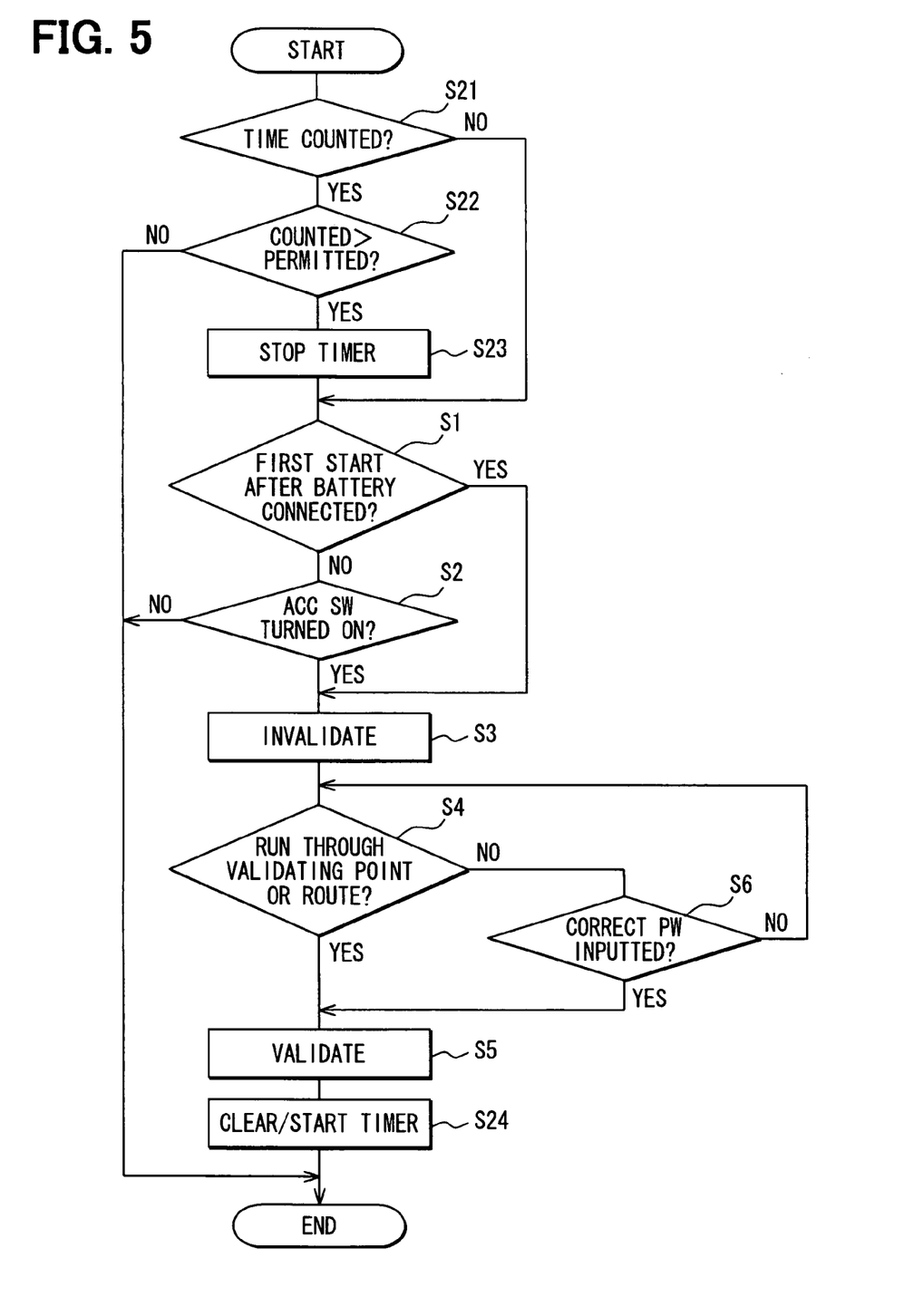
FIG. 5 is a flowchart diagram illustrating a function control process of a third embodiment.

FIG. 5 is similar to FIG. 2 to illustrate a function control process performed by the control unit 2 in a third embodiment when the navigation apparatus 1 is supplied with the power from an in-vehicle battery. Steps in FIG. 5 identical to those in FIG. 2 are assigned the same step numbers. Steps S21, S22, S23, S24 are new steps included in the process in the third embodiment. The control unit 2 of the third embodiment does not invalidate the predetermined function until a predetermined permission period elapses from when the vehicle travels through the invalidating route or invalidating point, irrespective of whether the navigation apparatus 1 is started up or not; therefore, the navigation apparatus 1 continues the normal operation during the permission period.

Before the determination for the start-up at Steps S1, S2, the control unit 2 determines whether a timer for counting the permission period is operating (Step S21). When the timer is determined not to be operating, Step S1 is performed. This timer is designed to continue to normally operate even when the in-vehicle battery is temporarily disconnected with the navigation apparatus 1: The timer time (i.e., counted time) is stored in non-volatile memory or RAM backed up by a battery. Alternatively, the clock time just before an in-vehicle battery is disconnected is stored in non-volatile memory, and the stored clock time is compared with a clock time when a battery is subsequently connected to compute the timer time.

When the timer is determined to be operating, Step S22 is then performed to determine whether the timer time exceeds a predetermined permission period (e.g., 24 hours). When the timer time does not exceed, it is during the permission period to thereby terminate the function control process. In contrast, when the timer time exceeds, Step S23 is then performed to stop the counting of the timer. The subsequent process is similar to that in FIG. 2 of the first embodiment. When the vehicle has traveled through the validating route or validating point or when an authorized password is entered, the once invalidated function is re-validated. Thereafter, the timer is cleared and started (Step S24).

In the third embodiment, once the vehicle travels through the validating route or validating point, the navigation apparatus 1 continues to normally operate for the following permission period irrespective of whether the start-up arises or not. Therefore, during the permission period, the authorized user need not travel through the validating route or validating point each time the start-up arises. In other words, the authorized user can take any optional route to reach a destination. For instance, a user may commute by car to travel through the validating route at a fixed time of a day. When setting the permission period to 24 hours, the user can use the navigation apparatus 1 in driving the vehicle anywhere without need of traveling through the validating route again within 24 hours. In this case, the stolen navigation apparatus 1 can be used only within the permission period. This still has the effect to deter stealing of the navigation apparatus 1.

Fourth Embodiment

Figure 6:
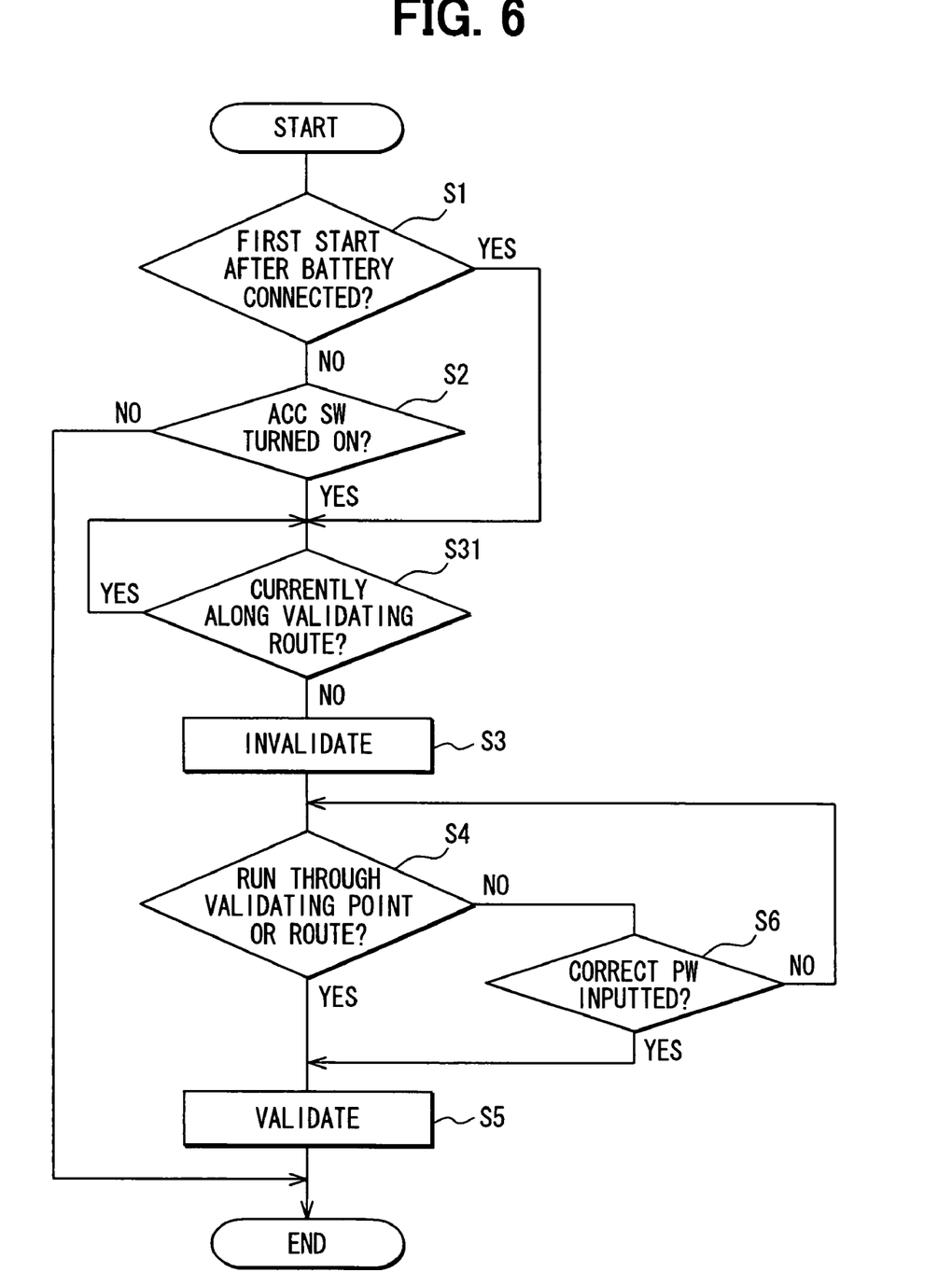
FIG. 6 is a flowchart diagram illustrating a function control process of a fourth embodiment.

FIG. 6 is similar to FIG. 2 to illustrate a function control process performed by the control unit 2 in a fourth embodiment when the navigation apparatus 1 is supplied with the power from an in-vehicle battery. Steps in FIG. 6 identical to those in FIG. 2 are assigned the same step numbers. Step S31 is a new step included in the process in the fourth embodiment. The control unit 2 of the fourth embodiment does not invalidate the predetermined function when a detected vehicle's position is on the validating route.

After the determination at either Step S1 or Step S2 is affirmed, the control unit 2 determines whether a vehicle's current position is on the validating route (Step S31). When the current position is determined to be on the validating route, the control unit 2 repeats performing this determination at Step S31 without performing Step S3 (i.e., without invalidating the function). During the repetition, the navigation apparatus 1 operates normally. In contrast, when the current position is determined not to be on the validating route, the process subsequently operates similar to that of the first embodiment in FIG. 2.

According to the fourth embodiment, an authorized user can retrieve or designate a destination without the predetermined function of the navigation apparatus 1 invalidated as long as traveling on the validating route. For instance, when the parking lot of the home is set to be included in the validating route, the user can decrease inconvenience to disturb the use of the navigation apparatus 1 at the start-up as much as possible. Thus, in this embodiment, when the vehicle is on the validating route at the start-up, the function is not invalidated until the vehicle departs from the validating route. Further, the following modification may be made: even in cases where the vehicle is not on the validating route at the start-up, the invalidated function may be temporarily validated when the vehicle is located on the validating route.

(Others)

At Step S4 in FIGS. 2, 4, 5, the invalidated function may be re-validated under the condition that the vehicle continues to stay at the validating point for a predetermined period or more. For instance, when the vehicle continues to stay at a car dealer designated as the validating point for 15 minutes or more, the navigation apparatus 1 returns to the normal operation. The continuing period may be measured by a timer. This structure of the modified embodiment prevents the navigation apparatus 1 from returning to the normal operation when the vehicle travels through the validating point by chance.

The second, third, and fourth embodiments may be optionally combined. In each embodiment, when the vehicle travels through the validating route or validating point, the invalidated function automatically returns to the normal operation; however, the invalidated function may return to the normal operation after a predetermined release operation is made.

Instead of entering a password, a password may be obtained from a storage medium (e.g., CD) attached to the navigation apparatus at purchasing.

In each embodiment, the determination for the password input may be eliminated.

The validating route or validating point may be stored in the external memory device 6 or another memory such as non-volatile memory, memory card, or hard disk device.

It is preferable that the validating route or validating point be encrypted and stored for preventing it from being easily read out.

The present invention may be directed at a portable navigation apparatus, without limiting to the navigation apparatus installed in a vehicle.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A navigation apparatus comprising:
a validating condition storage unit configured to store, as a validating condition, a validating route or validating point, the stored validating route or validating point being previously registered by an authorized user;
a position detector configured to detect a position;
a traveled record designation unit configured to designate a traveled record based on the detected position;
an invalidating control unit configured to invalidate a predetermined function; and
a validating control unit configured to validate the predetermined function invalidated by the invalidating control unit when the stored validating route or validating point previously registered as the validating condition by the authorized user is included in the designated traveled record, wherein:
a predetermined grace period starts after a start-up, which is for a first time after a battery is connected or which results from turning on of a power source;
the predetermined function is invalidated when a predetermined condition is fulfilled;
the predetermined condition is fulfilled when the predetermined grace period elapses to thereby invalidate the predetermined function.

* * * * *